Feb. 28, 1950     F. L. WINCHESTER     2,498,779
SELF-GUIDING TRAILER DOLLY
Filed March 7, 1947     2 Sheets-Sheet 1
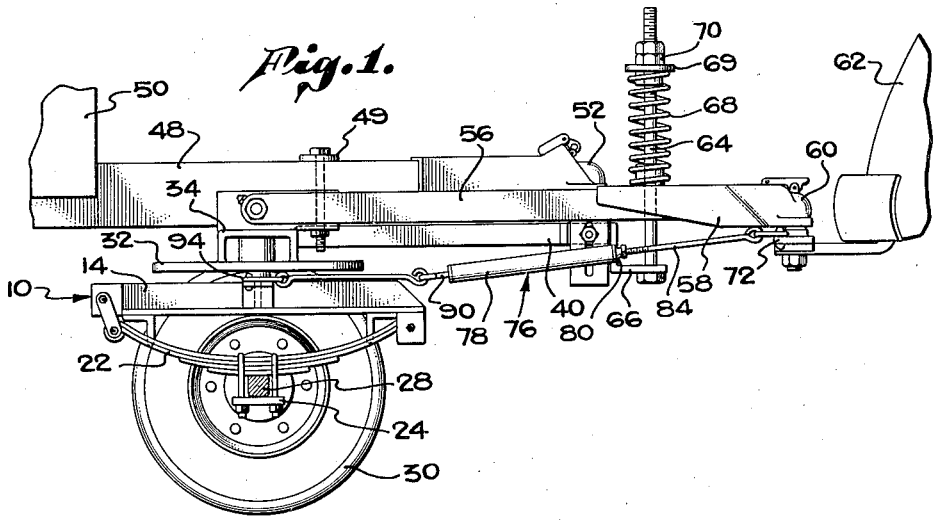
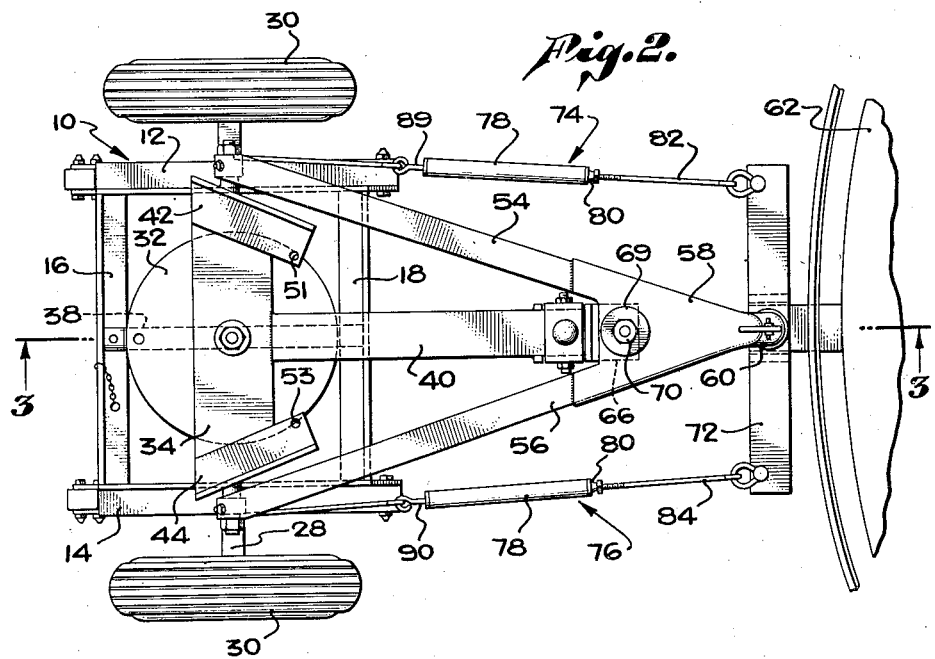
INVENTOR.
Franklin L. Winchester
BY
ATTORNEY

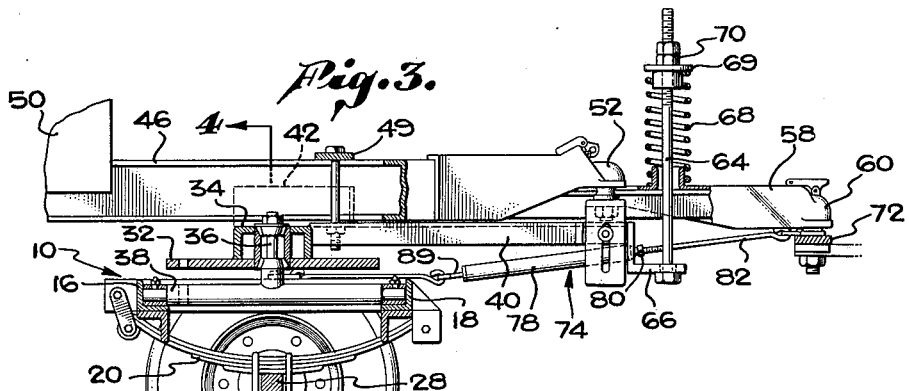
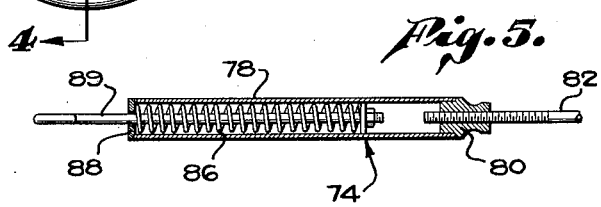
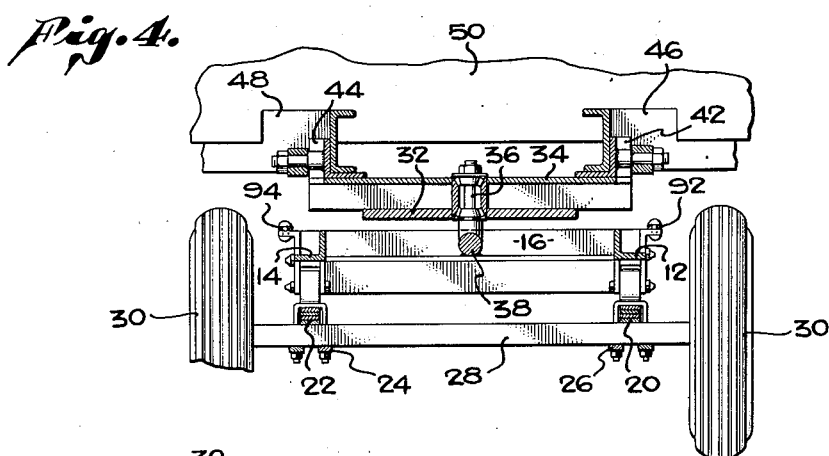
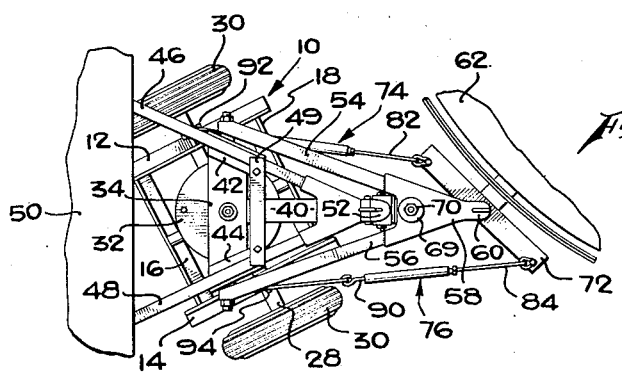

Patented Feb. 28, 1950

2,498,779

UNITED STATES PATENT OFFICE 2,498,779

SELF-GUIDING TRAILER DOLLY

Franklin L. Winchester, South Gate, Calif.

Application March 7, 1947, Serial No. 733,137

12 Claims. (Cl. 280—33.5)

My invention relates to a wheeled support or dolly particularly adapted to carry the front end of trailers and the like.

A particular advantage of the present construction is an arrangement of parts whereby the wheels and undercarriage of the dolly automatically turn, in response to turning of the towing vehicle, but such turning of the dolly is accomplished with sufficient gradualness that the dolly wheels continue to roll rather than skidding or being dragged around a corner when the lead car makes a sharp turn. Such result is accomplished by use of a pair of self-adjusting, reciprocally extensible and retractable steering arms, connecting opposite sides of the undercarriage with the towing vehicle, the arm closest to the turning point being automatically compressed while the opposite arm is simultaneously extended in making a turn.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

Referring to the drawings, which form part of the present specification:

Figure 1 is a side elevational view of my improved dolly with a trailer and towing car connected thereto;

Fig. 2 is a top plan view of the dolly with the trailer body removed;

Fig. 3 is a medial longitudinal sectional view of Figure 1, taken along the line 3—3 of Figure 2;

Fig. 4 is a transverse sectional view through the axis of rotation of the dolly, taken along the line 4—4 of Figure 3;

Fig. 5 is a side view, partly in elevation and part in section, through a tie rod; and Fig. 6 is a top plan view showing the dolly in revolved or turning position.

As here illustrated, the base of the dolly consists of a generally rectangular frame 10 composed of a pair of longitudinal supports 12 and 14 rigidly joined to each other near their respective ends by a pair of transverse members 16 and 18. Suspended beneath the opposite ends of each longitudinal support is a downwardly bowed leaf-spring assembly, 20 and 22 respectively, at the lowermost point of each of which is attached a housing 24 and 26, which housings jointly serve to journal a transverse axle 28 carrying a wheel 30 on either end thereof.

Above the frame 10 there is located a horizontally rotatable or "fifth wheel" structure consisting of a pair of swivel plates, vertically spaced apart and fixed in relation to each other, here formed of annular (32) and polygonal (34) shape, respectively. A centrally located, upstanding pintle 36 is journalled jointly by the two plates, being connected at its lower extremity to a horizontal spindle 38 which in turn has its opposite ends journalled in the transverse supports, 16 and 18 of the frame. A longitudinal, medially positioned tongue 40 extends forward from the upper polygonal plate 34, its upper face disposed substantially flush therewith.

A pair of forwardly converging, inwardly facing, L-shaped brackets 42 and 44 are carried by the upper swivel plate and adapted to support jointly therebetween a correspondingly shaped pair of extension arms 46 and 48 of a trailer 50, the extension arms converging in a conventional ball and socket type coupling 52 which is here fastened to the front end of the tongue 40. When the dolly is not available, the coupling 52 can of course be attached directly to a towing vehicle. The trailer arms 46 and 48 may be additionally secured to the L-brackets 42 and 44 by a cross piece 49 laid transversely on top of both trailer arms and bolted along the inner side of each to the bottom of each bracket at 51 and 53 respectively.

By the present dolly construction, the trailer, secured to the swivel plates 32 and 34, may revolve horizontally about the pintle 36 while the wheels 30 may rock vertically beneath the trailer on the spindle 38. Thus, when one wheel or the other strikes a bump or depression in the road, the frame 10 can tilt beneath the swivel structure and its supported trailer without rocking or jarring the latter.

It also acts as a weight equalizer so that each wheel gets an equal share of the weight when the road is uneven.

A pair of vertically swingable lead arms 54 and 56 are attached to opposite sides of the swivel structure, said arms converging to a flat, triangular bracket 58, the nose of which is provided with a ball-and-socket coupling 60 for attachment to a lead vehicle 62. The bracket 58 is centrally traversed by a vertical shaft 64, the lower extremity of which is fixed to the forward end of the tongue 40 by an angle iron 66. Above the upper face of the bracket 58, a coil spring 68 is located on the shaft 64 and held in compression by a core washer 69 which abuts against a tension nut 70 threadedly mounted on the shaft.

This arrangement serves to cushion the vertical play of the lead arms 54 and 56 of the dolly.

It also is a means of putting part of the forward trailer weight on the draw bar of the towing vehicle.

To put more weight on the draw bar of the towing vehicle the tension nut 70 is tightened down. When the tension nut 70 is loosened the dolly carries the weight.

At the point of attachment of the ball-and-socket connection 60 of the dolly to the lead vehicle 62, there is rigidly secured to the latter a transverse bar 72, the opposite ends of which are linked to the corresponding sides of the dolly frame 10 by a pair of extensible and compressible tie rods or steering arms 74 and 76. Each tie rod (Figure 5) consists of a hollow cylinder 78, the forward end of which is formed by a tapped plug 80 adapted to threadedly receive the rod 82 and 84 from the steering bar 72. The rear section of each cylinder 78 is occupied by a coil spring 86, which seats against the back wall 88 of the chamber, the front end of the helix 86 being connected to an axially slidable draw rod 89 or 90 which in turn is secured to the longitudinal supports 12 or 14 of the frame as the case may be.

The lead arms 54 and 56 can move vertically to allow for dips and high places in the road, but they cannot swing sideways which has a number of advantages. This is a safety factor on slick roads. Also, it is not possible for the towing vehicle's rear wheels to skid unless the dolly wheels skid also in the same direction. If the lead arms 54 and 56 could swing sideways, the dolly could skid one direction and cause the towing vehicle to skid in the opposite direction and the trailer would push to one side and forward up against a rear corner of the towing vehicle which might cause damage to the trailer and towing vehicle, or even cause a wreck if occuring while traveling at high speed.

Also, by the lead arms 54 and 56 not being permitted to swing sideways and by the dolly being guided by the steering arms 74 and 76, the trailer is backed like any two wheeled trailer. The dolly is simply guided beneath the front of the trailer by the steering arms and cannot swing around sideways, thus making the backing operation a simple matter for the driver.

It is important to note in this connection that the length of the steering bar 72, or rather the horizontal distance between the points of connection of the two tie rods 74 and 76 or their cables 82 and 84 connected thereto, is less than the distance between the opposite connections of these tie rods to the dolly frame at 92 and 94 respectively. By this arrangement, as seen in Figure 6, the degree of turning of the dolly frame will be in graduated proportion to, rather than simultaneously equal to, the turning of the lead vehicle. In this manner, a sudden swerve of the lead vehicle will not jerk the dolly undercarriage sidewise beyond the ability of the wheels to roll, but in contrast the compression of one steering arm (such as 74 in Fig. 6) and extension of the other (such as 76 in Fig. 6) due to the action of their respective helices will effect a gradual arcing path of the wheels 30. It will be observed also that the tie rods are of sufficient height for the adjacent wheels to move beneath them.

While I have shown and described in some detail a presently preferred embodiment of my self-guiding trailer dolly, it is to be understood that various modifications may be made in the construction and operation thereof within the scope of the subsequently claimed invention which is to be construed broadly and limited only by the prior art.

I claim:

1. A dolly for a trailer and the like, including: a frame having a wheel operatively mounted on each side thereof, a horizontally rotatable structure adapted to support a trailer body disposed above said frame, coupling means adapted to secure a trailer to said dolly, vertically swingable coupling means adapted to secure said dolly to a towing vehicle, said coupling means being centrally attached to a steering bar horizontally disposed at the rear of said vehicle, and a pair of generally horizontally disposed, reciprocally expansible and contractable tie rods, fixedly secured to opposite sides of said frame and pivotally attached adjacent the opposite ends of said steering bar respectively, the lateral displacement of said tie rods at their points of attachment to the towing vehicle being less than at their attachment to said frame, each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

2. A dolly for a trailer and the like, including: a frame having a wheel operatively mounted on each side thereof, a horizontally rotatable structure adapted to support a trailer body disposed above said frame, bracket means on said structure adapted to detachably retain a pair of trailer arms thereon, a pair of lead arms vertically swingable on said structure and adapted to be coupled to a towing vehicle, said coupling means being centrally attached to a steering bar horizontally disposed at the rear of said vehicle and a pair of generally horizontally disposed, reciprocally expansible and contractable tie rods, fixedly secured to opposite sides of said frame and pivotally attached adjacent the opposite ends of said steering bar respectively, the lateral displacement of said tie rods at their points of attachment to the towing vehicle being less than at their attachment to said frame, each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

3. A dolly for a trailer and the like, including: a frame having a wheel operatively mounted on each side thereof, a horizontally rotatable structure adapted to support a trailer body disposed above said frame, coupling means adapted to secure a trailer to said dolly, vertically swingable coupling means adapted to secure said dolly to a towing vehicle, said coupling means being centrally attached to a steering bar horizontally disposed at the rear of said vehicle and a pair of generally horizontally disposed, reciprocally expansible and contractable tie rods, fixedly secured to opposite sides of said frame and pivotally attached adjacent the opposite ends of said steering bar respectively, each of said tie rods comprising a tubular member, a rod extending from either end to the dolly and towing vehicle respectively, and a coil spring disposed within said tube and attached to one of said cables so as to allow it to reciprocate longitudinally within the tube with the expansion and contraction of the coil spring.

4. A dolly for a trailer and the like, including: a frame having a wheel operatively mounted on each side thereof, a horizontally rotatable structure adapted to support a trailer body disposed above said frame, bracket means on said structure adapted to detachably retain a pair of trailer arms thereon, a pair of lead arms vertically swingable on said structure and adapted to be coupled to a towing vehicle, said coupling means being centrally attached to a steering bar horizontally disposed at the rear of said vehicle and a pair of generally horizontally disposed, reciprocally expansible and contractable tie rods, fixedly secured to opposite sides of said frame and pivotally attached adjacent the opposite ends of said steering bar respectively, each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

5. A dolly for a trailer and the like, including: a frame having a wheel operatively mounted on each side thereof, a horizontally rotatable structure adapted to support a trailer body disposed above said frame, coupling means adapted to secure a trailer to said dolly, vertically swingable coupling means adapted to secure said dolly to a towing vehicle, and a pair of generally horizontally disposed, reciprocally expansible and contractable tie rods, fixedly secured to opposite sides of said frame and pivotally attached adjacent the opposite sides of said towing vehicle, each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

6. A dolly for a trailer and the like, including: a frame having a wheel operatively mounted on each side thereof, a horizontally rotatable structure adapted to support a trailer body disposed above said frame, coupling means adapted to secure a trailer to said dolly, vertically swingable coupling means adapted to secure said dolly to a towing vehicle, and a pair of generally horizontally disposed, reciprocally expansible and contractable tie rods, fixedly secured to opposite sides of said frame and pivotally attached adjacent the opposite sides of said towing vehicle, the lateral displacement of said tie rods at their points of attachment to the towing vehicle being less than at their attachment to said frame; each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

7. A dolly for a trailer and the like, including: a frame having a wheel operatively mounted on each side thereof, a horizontally rotatable structure adapted to support a trailer body disposed above said frame, bracket means on said structure adapted to detachably retain a pair of trailer arms thereon, a pair of lead arms vertically swingable on said structure and adapted to be coupled to a towing vehicle, and a pair of generally horizontally disposed, reciprocally expansible and contractable tie rods, fixedly secured to opposite sides of said frame and pivotally attached adjacent the opposite sides of said towing vehicle, each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

8. A dolly for a trailer and the like, including: a frame having a wheel operatively mounted on each side thereof, a horizontally rotatable structure adapted to support a trailer body disposed above said frame, bracket means on said structure adapted to detachably retain a pair of trailer arms thereon, a pair of lead arms vertically swingable on said structure and adapted to be coupled to a towing vehicle, and a pair of generally horizontally disposed, reciprocally expansible and contractable tie rods, fixedly secured to opposite sides of said frame and pivotally attached adjacent the opposite sides of said towing vehicle, the lateral displacement of said tie rods at their points of attachment to the towing vehicle being less than at their attachment to said frame, each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

9. A dolly for a trailer and the like including: a frame having a wheel operatively mounted on each side thereof, a horizontally rotatable structure adapted to support a trailer body disposed above said frame, coupling means adapted to secure a trailer to said dolly, vertically swingable coupling means adapted to secure said dolly to a towing vehicle, a horizontally rigid vertically movable tongue, and a pair of generally horizontally disposed, reciprocally expansible and contractable tie rods, fixedly secured to opposite sides of said frame and pivotally attached adjacent the opposite ends of said steering bar respectively, each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

10. A dolly for a trailer and the like including: a frame having a wheel operatively mounted on each side thereof, a horizontally rotatable structure adapted to support a trailer body disposed above said frame, coupling means adapted to secure a trailer to said dolly, vertically swingable coupling means adapted to secure said dolly to a towing vehicle, a horizontally rigid vertically movable tongue said coupling means being fastened to the front end of said tongue, the rearward end of said tongue being hingedly mounted on said dolly, a pair of generally horizontally disposed, reciprocally expansible and contractable tie rods, fixedly secured to opposite sides of said frame and pivotally attached adjacent the opposite ends of said steering bar respectively, the lateral displacement of said tie rods at their points of attachment to the towing vehicle being less than at their attachment to said frame and a fifth wheel to effect rotation at a point midway between the wheels.

11. A dolly for a trailer and the like including: a frame having a wheel operatively mounted on each side thereof, a horizontally rotatable structure adapted to support a trailer body disposed above said frame, coupling means adapted to secure a trailer to said dolly, vertically swingable coupling means adapted to secure said dolly to a towing vehicle, means for transferring the weight of said trailer from said dolly to said towing vehicle, and a pair of generally horizontally disposed, reciprocally expansible and contractable tie rods, fixedly secured to opposite sides of said frame and pivotally attached adjacent the opposite ends of said steering bar, respectively, each of said tie rods comprising a tubular member, a cable extending from either end to the dolly and towing vehicle respectively, and a coil spring disposed within said tube and attached to one of said cables so as to allow it to reciprocate longitudinally within the tube with the expansion and contraction of the coil spring.

12. A dolly for a trailer and the like including: a frame having a wheel operatively mounted on each side thereof, a horizontally rotatable structure adapted to support a trailer body disposed above said frame, coupling means adapted to secure a trailer to said dolly, vertically swingable coupling means adapted to secure said dolly to a towing vehicle, manually adjustable means for transferring the weight of said trailer from said towing vehicle to said dolly, a pair of generally horizontally disposed, reciprocally expansible and contractable tie rods, fixedly secured to opposite sides of said frame and pivotally attached adjacent the opposite ends of said steering bar respectively, the lateral displacement of said tie rods at their points of attachment to the towing vehicle being less than at their attachment to said frame and a fifth wheel to effect rotation at a point midway between the wheels.

FRANKLIN L. WINCHESTER.

REFERENCES CITED

The following references are of record in the file of this patent:

UNITED STATES PATENTS

| Number | Name | Date |
|---|---|---|
| 990,793 | Woodward | Apr. 25, 1911 |
| 2,001,408 | Burton | May 14, 1935 |
| 2,180,257 | Rollins | Nov. 14, 1939 |
| 2,206,991 | Williams et al. | July 9, 1940 |
| 2,410,241 | Schramm | Oct. 29, 1946 |